United States Patent [19]
Jenkins

[11] Patent Number: 5,160,125
[45] Date of Patent: Nov. 3, 1992

[54] TRANSMISSION UTILITY STAND

[76] Inventor: Bobby L. Jenkins, P.O. Box 982, Inola, Okla. 74036

[21] Appl. No.: 484,062

[22] Filed: Feb. 23, 1990

[51] Int. Cl.$^5$ .............................................. B66F 3/00
[52] U.S. Cl. ........................................ 269/50; 269/17; 269/71; 269/76; 269/60
[58] Field of Search ................ 269/71, 47, 50, 51, 269/52, 71, 60, 296, 76; 254/DIG. 16, 134, 133

[56] References Cited

U.S. PATENT DOCUMENTS

| | | | |
|---|---|---|---|
| 2,774,134 | 12/1956 | Smith et al. | 269/296 |
| 2,799,920 | 7/1957 | Hansen | 269/17 |
| 3,858,864 | 1/1975 | Waldow | 269/17 |
| 4,050,671 | 9/1977 | Coleman | 269/17 |
| 4,122,956 | 10/1978 | Hargrove | 269/16 |
| 4,183,511 | 1/1980 | Marek | 269/17 |
| 4,239,196 | 12/1980 | Hunger | 269/17 |
| 4,300,751 | 11/1981 | Delaney | 254/2 R |
| 4,533,127 | 8/1985 | Hawkins | 269/17 |
| 4,560,151 | 12/1985 | Grundy | 269/50 |

Primary Examiner—Robert C. Watson

[57] ABSTRACT

Disclosed is an automotive transmission utility stand which comprises a base, an upright stanchion connected to the base, and a bracket attached to the upper portion of the stanchion and which bracket having a means to be removably attached to the rear mount of a transmission. Further this invention can be equipped with an output shaft retainer which adjustably mounts on the stanchion and which is also horizontally adjustable outwardly over the base to match different transmission sizes. Even further, the invention can be equipped with means for tilting the stand to adjust the center of gravity.

2 Claims, 2 Drawing Sheets

TRANSMISSION UTILITY STAND

BACKGROUND OF THE INVENTION

A. Field of the Invention

The present invention relates to a transmission utility stand for supporting, transporting and maneuvering an automotive transmission during the performance of maintenance or repair thereon.

B. Description of the Prior Art

In the overhaul, maintenance, rebuild and most repair of manual and automatic transmissions for rear wheel drive automotive vehicles, the transmission is removed from the vehicle. It is then transported to a support stand or bench where the necessary work or maintenance is performed. In some cases the transmission is transported to the support stand or work bench by a heavy duty crane or jack which must be able to lift the transmission as much as waist-high or higher. The transmission is preferably transported to a work bench when it is to be completely disassembled. At one point during disassembly and reassembly, the transmission is preferably held on the stand in the vertical position for removal and installation of the output shaft, gears and clutch assemblies, pump, and etc. Even further, when some transmissions are worked on in the vertical position, in addition to the support for the transmission case, a separate attachment must be used to retain the output shaft in place.

It is desired that these operations be done with ease and with little risk of causing damage to the transmission or to personnel handling it. As stated above, heavy jacks, cranes and special and expensive equipment were necessary to handle the transmissions with safety and utility. However, for many small transmission repair shops and individuals who repair their own transmissions, it is impractical to acquire such equipment. Even in larger shops it can be cumbersome and inconvenient to use such heavy equipment. Various transmission supports which are designed to handle some of these problems have been used by the prior art.

U.S. Pat. No. 4,010,942 to Ward discloses a transmission repair support assembly comprising a first and a second portion that may be separated and teaches attaching one portion to the transmission and with the use of a crane lift the transmission to be mounted on the other portion whereon the transmission can be transported to various locations.

U.S. Pat. No. 4,307,877 to Rogos discloses a transmission fixture comprising a rigid elongated framework having a traverse mounting member at one end for attachment to the bell housing of the transmission, a belt to wrap around the opposite end to pull the transmission toward the framework and a central extendible support member to engage the center of the transmission case to the framework.

U.S. Pat. No. 4,560,151 to Grundy discloses a transmission mounting stand comprising a rigid and open frame, a yoke supported thereon adjacent its front end and across the frame, a pair of side bar structures attachable to the wider end portion of the transmission case, an upwardly extending support crossbar having a support platform and which supports the narrow end of the yoke, wherein the structure is mounted in several different orientations for different orientations of the transmission case.

U.S. Pat. No. 2,814,099 to Knittel discloses a combination jack and work stand comprising a base, a vertically adjustable standard, and a cradle which is tiltable to any suitable angle and which is rotatable about a vertical axis so that a transmission supported thereon can be raised and lowered, tilted or rotated 180 degrees.

U.S. Pat. No. 4,533,127 to Hawkins discloses a stand especially useful as an automotive engine stand having a wheel with a locking mechanism and having a vertically strapped post inclined rearwardly from its point of attachment between outwardly tapering sections which form a longitudinal base portion.

U.S. Pat. No. 4,140,306 to Wheeler discloses a fixture for mounting an article to be worked on and includes a base having an end member together with an arm pivotally mounted on the end member and having means for securing the arm in various pivoted positions and said arm having screw members located for selective engagement with the article.

These stands are inadequate either because (1) they are big and bulky, (2) require heavy cranes for lifting the transmission, (3) does not lend to transporting the transmission upon a work bench, (4) does not have a built-in provision to retain the output shaft in place, (5) does not have a provision to adjust the center of gravity, or (6) is to complex and expensive.

It is therefore an object of this invention to provide a stand where its mounting bracket can be placed on the transmission before it is removed from the car. Further, it is an object of this invention to provide a means for adjusting the center of gravity of the stand for various transmissions mounted thereon. Further it is an object of this invention to provide a built-in, adjustable means for retaining the output shaft in place when necessary. Further, it is an object of this invention to provide a stand that will aid in lifting the transmission upon a work bench. Even further it is an object of this invention to provide a stand which holds the transmission in a vertical position for disassembly and assembly.

SUMMARY OF THE INVENTION

Accordingly this invention provides a simple, inexpensive transmission utility stand which comprises a base, an upright stanchion connected to the base, and a bracket attached to the upper portion of the stanchion and which bracket having a means to be removably attached to the rear mount of a transmission. Further this invention can be equipped with a transmission output shaft retainer which adjustably mounts on the stanchion to hold the output shaft in place during assembly and disassembly. Said retainer can also be horizontally adjustable outwardly over the base to align with the output shaft of various transmissions. Even further, to adjust the center of gravity, the stand of the present invention can be equipped with means for tilting the stand to distribute the weight of the transmission over the center of the base.

DESCRIPTION OF THE PREFERRED EMBODIMENT

Figure 1:
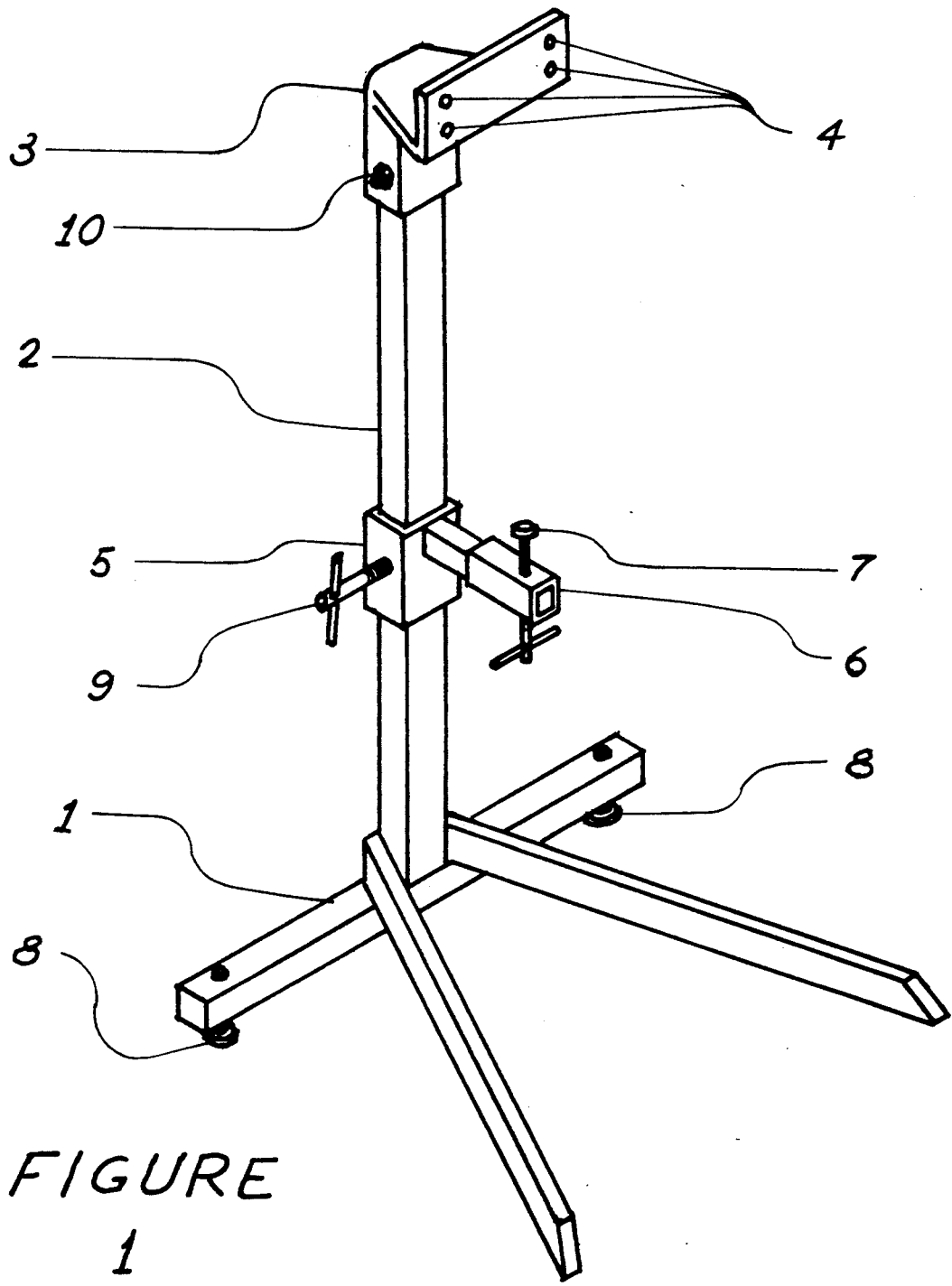
FIG. 1 is a perspective view of a transmission utility stand embodied by the present invention.

Accordingly to the present invention, provided is a simple, inexpensive transmission utility stand comprising a base, an upright stanchion connected to the base, and a transmission mounting bracket attached to the upper portion of the stanchion. The base of the stand is large and strong enough to support a transmission which after being mounted on the stand in the vertical position is approximately 1.2 to 1.6 meters high. Thus this base has an effective area that is not too big and cumbersome and at the same time is large enough to support the transmission. The base can be a reinforced flat metal material or it may consist of three or more legs. Bases for such stands are easily determinable by one skilled in the art.

The stanchion is attached to the base. It is preferred that the stanchion is connected primarily to the middle of one side of the base so that the weight of a transmission is distributed over the base. It is also preferred that the stanchion tilts slightly toward the center of the base. This stanchion can be made of any suitable strong material such as extruded tubular steel suitable to support the weight of a transmission. The stanchion is between about 30 and about 100 centimeters high. The stanchion is preferably about 60 centimeters high so that when a transmission is mounted on the stand of the present invention, it will be above the height of the normal work bench which is approximately 1 meter high.

The transmission mounting bracket is connected to the upper portion of the bracket. It is preferred that the stanchion is removably connected to the upper portion and preferably on top of the stanchion. The mounting bracket is comprised of a mounting face and a means to attach it to the stanchion. Holes are provided on the mounting face of the bracket so that it will match the hole pattern of the rear mount of most transmissions. Because of the pequiliarity of different transmissions, the mounting face of the bracket is somewhat offset from its attachment to the stanchion so that when mounted to a transmission, the transmission will clear the stanchion. This mounting bracket can simply be mounted on top of the stanchion and secured with a bolt through the bracket and the stanchion. However there are other means by which the bracket may mount to the stanchion by methods well known in the art.

In the rear wheel drive automobile, the transmission is ordinarily supported by securing its front directly to the rear of the engine and by securing its rear portion to a cross member upon which the rear mount of the transmission rests. This rear mount is usually equipped with mounting holes to engage the rear mount to the cross member. For the removal of this transmission, the cross member is normally removed while the transmission is supported by a jack. The transmission rear mounting holes left from the cross member removal are used to attach the mounting bracket of the present invention. Thus the mounting bracket will have mounting holes to match this rear mount of the transmission and can be secured to the transmission with the same hardware as the cross member. In the use of the present invention, it is convenient to attach the removable mounting bracket to the transmission before the transmission is removed from the car.

The utility stand of the present invention can be equipped with an adjustable output shaft retainer. This output shaft retainer is useful for certain overdrive transmissions which have no means to support the output shaft during reassembly. This output shaft retainer is mounted on the stanchion between the base and the transmission mounting bracket. It is preferred that it is adjustable by movement up and down the stanchion and that it can be secured any position on the stanchion. This output shaft retainer also includes an adjustment means extending horizontally outward over the base as well as an additional fine vertical adjusting means on the outward extension to align with the output shaft of various transmissions.

The utility stand of the present invention can be further equipped with a means for changing the center of gravity of the transmission on the stand. This means for changing the center of gravity changes the tilt of the overall stand so that the weight of a mounted transmission is distributed over the center of the base. This means may be attached on the base near its edge on adjacent sides of the stanchion or on the base near its edge opposite the stanchion. This adjustment may be accomplished simply by a bolt that is mounted into that part of the base such that by screwing the bolt in and out, the stand will tilt to change the center of gravity of the stand toward the center of the base.

Reference is now made to FIG. 1 which shows a perspective view of the transmission utility stand. Base 1 has attached thereon a stanchion 2. Removably mounted on top of stanchion 2 is transmission mounting bracket 3 in which are mounting holes 4. The transmission mounting bracket 3 is secured to stanchion 2 by nut and bolt 10. Adjustably mounted on stanchion 2 is output shaft retainer 5 having outward adjusting means 6 and a fine vertical adjustment means 7. The output shaft retainer is secured to the stanchion with screw 9. On the bottom of the base 1 on adjacent sides of the stanchion 2 are center of gravity adjusters 8.

Figure 2:
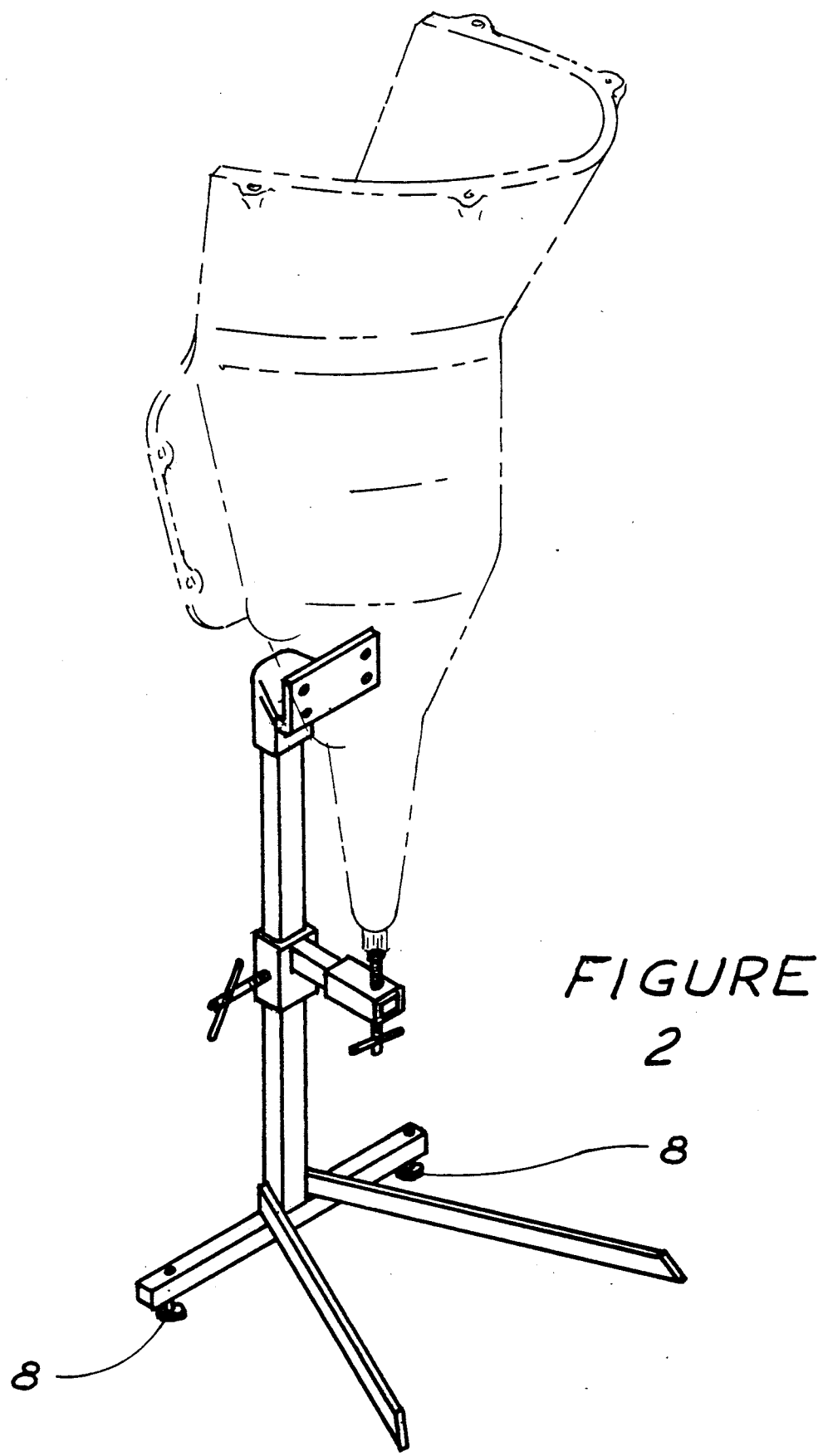
FIG. 2 is a side view of the transmission utility stand embodied by the present invention with a mounted transmission simulated in broken lines.

In the operation of the present invention, the transmission mounting bracket 3 is removed from the utility stand. When removing a transmission from the vehicle and while the transmission is supported by a jack, the cross member is removed and disconnected from the transmission rear mount. The transmission mounting bracket 3 is then secured to the transmission rear mount in place of the cross member. The transmission is then removed from the vehicle. After the transmission is removed from the vehicle, the remainder of the utility stand is re-attached to the bracket. Reference is now made to FIG. 2. The transmission can then be stood uprightly supported on the stand with the stand on its base as shown in FIG. 2. The center of gravity is then adjusted by adjusters 8 so that the unit can stand alone.

The transmission can then be disassembled and reassembled while it is still mounted on the stand. If it is preferred to work on a bench, the unit is taken near the bench so that the top of the transmission extends above the bench. The unit is then tilted onto the bench and the base is lifted up to bring the entire unit onto the bench. The transmission mounting bracket 3 is again removed from the remainder of the stand while the transmission is worked on at the bench. When the transmission is ready for reassembly, the transmission case, still having the mounting bracket thereon, is re-attached to the remainder of the stand and the unit is tilted back onto the floor. Reassembly of the transmission can then be accomplished. The output shaft retainer can be adjusted in place to retain the output shaft, if necessary. Otherwise, the output shaft retainer is adjusted down to the base so that it will be free from interferring with the transmission.

It can be seen readily that this transmission utility stand can be used for a large variety of transmissions, automatic or standard, whether the vehicle is domestic or foreign or whether it is for an automobile, truck or heavy equipment. The only requirement is that the transmission have a rear mounting bracket. It can be seen further that there are many modifications that can be made of this transmission utility stand without departing from applicant's inventive concept.

I claim:

1. An automotive transmission utility stand comprising:
   A. base;
   B. upright stanchion connected to the base; and
   C. transmission mounting bracket attached to the upper portion of the stanchion, said bracket having a means to be removably attached to the rear mount of a transmission;
   wherein the stanchion is tilted toward the center of the base.

2. An automotive transmission utility stand comprising:
   A. base with three or more legs;
   B. upright stanchion connected primarily to one side of the base and slightly tilted toward the center of the base;
   C. transmission mounting bracket removably attached to the top of the stanchion, said bracket being somewhat offset from its attachment to the stanchion and said bracket having mounting holes so that it can be removably attached to the rear mount of a transmission;
   D. means which is attached to the base to adjust the center of gravity of the stand; and
   E. output shaft retainer adjustably mounted on the stanchion between the base and the transmission mounting bracket and having a horizontal adjustable means extending outwardly over the base and the horizontal adjustable means having a secondary fine vertical adjusting means.

* * * * *